(12) United States Patent
Kairali et al.

(10) Patent No.: US 12,476,969 B2
(45) Date of Patent: Nov. 18, 2025

(54) DYNAMIC SBOM BASED SECURE DOCKING OF EDGE CAPACITY TO EXISTING COMPUTING SYSTEMS

(71) Applicant: International Business Machines Corporation, Armonk, NY (US)

(72) Inventors: Sudheesh S. Kairali, Kozhikode (IN); Sarbajit K. Rakshit, Kolkata (IN); Sudhanshu Sekher Sar, Bangalore (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 18/239,177

(22) Filed: Aug. 29, 2023

(65) Prior Publication Data

US 2025/0080533 A1    Mar. 6, 2025

(51) Int. Cl.
*H04L 9/40*         (2022.01)
*H04L 67/1097*      (2022.01)

(52) U.S. Cl.
CPC .............. *H04L 63/10* (2013.01); *H04L 63/20* (2013.01); *H04L 67/1097* (2013.01)

(58) Field of Classification Search
CPC ...... H04L 63/10; H04L 63/20; H04L 67/1097
USPC ............................................... 726/3; 709/229
See application file for complete search history.

(56) References Cited

U.S. PATENT DOCUMENTS

| | | |
|---|---|---|
| 10,721,275 B2 | 7/2020 | Kung et al. |
| 2022/0046059 A1 | 2/2022 | Pandurangi et al. |
| 2022/0360567 A1 | 11/2022 | Vasseur et al. |
| 2023/0090200 A1 | 3/2023 | Rakshit et al. |

OTHER PUBLICATIONS

"CycloneDX", CycloneDX, https://cyclonedx.org, accessed online Aug. 25, 2023, 6 pages.
"Dynamic SBOM is the Future of Software Security", Rezilion, Feb. 17, 2022, 6 pages.
"Edge and On-Premises Security", Mondoo, accessed online May 3, 2023, 12 pages.
"The Software Package Data Exchange® (SPDX®)", The Linux Foundation, https://spdx.org, accessed online Aug. 25, 2023, 3 pages.
Gillson, Tyler, "One-Click SBOM for Your Kubernetes Clusters with Palette", The New Stack, Feb. 22, 2023, 12 pages.

(Continued)

*Primary Examiner* — Liang Che A Wang
(74) *Attorney, Agent, or Firm* — CHIP LAW GROUP

(57) ABSTRACT

Mechanisms are provided for controlling docking of an edge capacity with a cloud computing system. A bill of materials (BOM) enabled agent, executing on the edge capacity, sends a BOM data structure specifying components of a configuration of the edge capacity. A lookup operation of components of the BOM data structure is performed in a BOM controls mapping data structure to identify controls or policies applicable to the components of the BOM data structure. The identified controls/policies are transmitted to the BOM enabled agent for execution to determine if there are any violations. Results of the identified controls or policies are received which specify whether there are any violations of the controls/policies. In response to at least one violation being detected, docking of the edge capacity with the cloud computing system is denied. In response to no violations, the edge capacity docks with the cloud computing system.

20 Claims, 3 Drawing Sheets

(56) References Cited

OTHER PUBLICATIONS

Stewart, Kate, "SPDX: It's Already in Use for Global Software Bill of Materials (SBOM) and Supply Chain Security", The Linux Foundation, May 25, 2021, 5 pages.
IBM. "Security and Compliance Center", retrieved from https://web.archive.org/web/20201105090135/https://www.ibm.com/cloud/security-and-compliance-center, Nov. 5, 2020, 1 page.
Nagaratnam Nataraj. "Achieving Continuous Security and Compliance on IBM Cloud for Financial Services", retrieved from https://web.archive.org/web/20201126021555/https://www.ibm.com/cloud/blog/achieving-security-and-compliance-on-IBM-cloud-for-financial-services, Jul. 22, 2020, 3 pages.

DYNAMIC SBOM BASED SECURE DOCKING OF EDGE CAPACITY TO EXISTING COMPUTING SYSTEMS

BACKGROUND

The present application relates generally to an improved data processing apparatus and method and more specifically to an improved computing tool and improved computing tool operations/functionality for dynamic software bill of materials (SBOM) based secure docking of edge capacities to existing computing systems.

Recent trends of edge computing extend cloud computing and the Internet of Things (IoT) to the edge of the cloud computing network. The edge of the cloud computing network is a portion of the cloud computing network near the periphery of the network where devices and systems connect to the cloud computing network to provide their capabilities. Edge capacity refers to the capabilities of the edge devices and systems to perform work and may include many different factors such as processing capabilities, storage capabilities, particular functionalities and services provided by the software executing on the computing devices and systems, and the like. The edge capacity may be provided by individual devices, collections of devices, networks of devices, and the like. For example, an edge capacity may be provided by a data center, a laptop, a computing system in a vehicle, or any other source of computing capacity.

Edge computing moves more computational power and resources closer to end users by increasing the number of endpoints and locating them nearer to the consumers. Edge computing reduces latency in operations as the processing and storage capabilities are closer to the sources of data. Fundamentally, edge computing architectures are built on existing technologies and established paradigms for distribute systems, which means that there are many well understood components available to create the most effective architectures to build and deliver edge use cases.

One of the primary objectives of the edge computing architectures is to process data as early as possible at the edges so that large amounts of raw data are not transmitted over the data networks and the cloud computing system. However, a challenge exists in that each edge capacity added to the cloud computing system and data networks exposes the network/system to security threats, as the various edge capacities may not have similar safeguards to each other or to the network/cloud computing system. There is no ability to dynamically check whether an edge capacity, provided by one or more computing devices/systems, has acceptable compliance and security compared to the existing network/cloud computing system to which the edge capacity is docking.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for controlling docking of an edge capacity with a cloud computing system. The method comprises receiving, from a bill of materials (BOM) enabled agent executing on the edge capacity, a BOM data structure specifying components of a configuration of the edge capacity. The method further comprises performing a lookup operation of components of the BOM data structure in a BOM controls mapping data structure, to identify controls or policies applicable to the components of the BOM data structure. The method also comprises transmitting the identified controls or policies to the BOM enabled agent for execution on the edge capacity to determine if there are any violations of the controls or policies. In addition, the method comprises receiving results of execution of the identified controls or policies by the BOM enabled agent. The results specify whether there are any violations of the controls or policies. In response to the results specifying that there was at least one violation of the controls or policies, the method denies docking of the edge capacity with the cloud computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
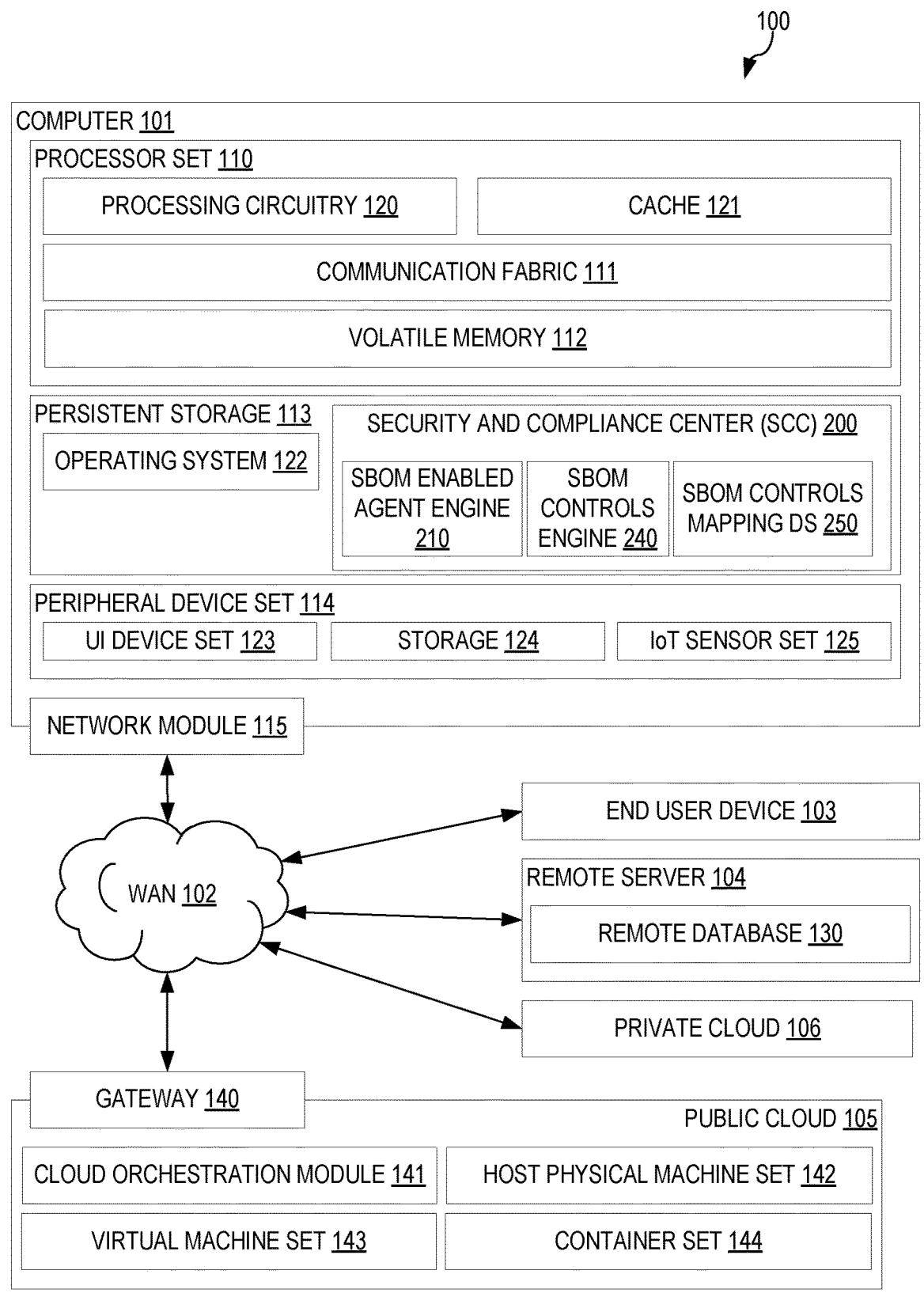
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality specifically directed to improving the security and compliance of edge capacities docking with existing cloud computing systems and data networks. In particular, the illustrative embodiments implement an enhanced agent mechanism where the agents are able to dynamically generate software bill of materials (SBOMs) and dynamically determine changes in such SBOMs over time. Based on the SBOMs for edge capacities, and a mapping of SBOM components with security and compliance policies and controls, corresponding security and compliance policies and controls are determined for the SBOM components and applied to ensure that the edge capacity comports with security and compliance requirements, and to perform operations for allowing or restricting docking of edge capacities based on whether those edge capacities are in compliance. In some illustrative embodiments, a fast forward capability is provided that uses similarities between SBOMs of edge capacities to retrieve profiles of security and compliance policies to be applied to edge capacities with similar SBOMs.

The following description provides examples of embodiments of the present disclosure, and variations and substitutions may be made in other embodiments. Several examples will now be provided to further clarify various aspects of the present disclosure.

Example 1: A method, in a data processing system, for controlling docking an edge capacity with a cloud computing system. The method comprises receiving, from a bill of materials (BOM) enabled agent executing on the edge capacity, a BOM data structure specifying components of a configuration of the edge capacity. The method also comprises performing a lookup operation of components of the BOM data structure in a BOM controls mapping data structure, to identify controls or policies applicable to the components of the BOM data structure. In addition, the method comprises sending/transmitting the identified controls or policies to the BOM enabled agent for execution on the edge capacity to determine if there are any violations of the controls or policies. Moreover, the method comprises receiving results of execution of the identified controls or policies by the BOM enabled agent, where the results specify whether there are any violations of the controls or policies. Furthermore, the method comprises denying docking of the edge capacity with the cloud computing system in response to the results specifying that there was at least one violation of the controls or policies.

The above limitations advantageously enable automatic determination of controls or policies to be applied by a BOM enabled agent based on the BOM of the configuration of the edge capacity. The identified controls or policies are able to be automatically applied by the BOM enabled agent to determine if there are any controls/policy violations. Thus, cloud computing system providers are able to enforce controls/policies automatically on edge capacities attempting to dock with their cloud computing systems. In this way, the security of the cloud computing system is improved by automatically enforcing each edge capacity that wants to dock with the cloud computing system to have to abide by corresponding controls/policies for the particular components of the edge capacity's specific bill of materials.

Example 2: The limitations of any of Examples 1 and 3-10, where the BOM enabled agent automatically scans the configuration of the edge capacity to generate the BOM data structure in response to a request from the edge capacity to dock with the cloud computing system. The above limitation advantageously enables automatic identification of the bill of materials for a configuration of an edge capacity so that corresponding controls/policies may be automatically determined for the components of the BOM.

Example 3: The limitations of any of Examples 1-2 and 4-10, where the BOM enabled agent automatically scans the configuration of the edge capacity to generate the BOM data structure periodically while the BOM enabled agent is executing on the edge capacity. The above limitation advantageously enables dynamic modification of the bill of materials for edge capacities based on changes to the configuration of the edge capacity and/or changes to controls/policies that may be applicable to the components of the bill of materials. Hence, a dynamic solution to docking edge capacities with cloud computing systems is achieved.

Example 4: The limitations of any of Examples 1-3 and 5-10, where the BOM enabled agent automatically scans the configuration of the edge capacity to generate the BOM data structure in response to a detected event, wherein the detected event is a change in configuration of the edge capacity. The above limitations advantageously enables dynamic modification of the BOM data structure specifically based on configuration changes to the edge capacity allowing the BOM data structure to be maintained consistent with the current configuration of the edge capacity. This ensures that controls/policies applicable to the current state of the configuration of the edge capacity are identified and applied by the BOM enabled agents.

Example 5: The limitations of any of Examples 1-4 and 6-10, where performing the lookup operation comprises performing a search of components specified in the BOM data structure in the BOM controls mapping data structure that maps components to controls or policies with which the components are to be in compliance, wherein the controls or policies comprise default controls or policies, and one or more cloud computing system provider specified controls or policies. The above limitations advantageously permit a mapping of BOM data structure components to their corresponding controls or policies to ensure the security of the cloud computing system. Moreover, default controls/policies may be established to ensure at least a minimum level of compliance requirement with security requirements of the cloud computing system. Cloud computing system provider specified controls or policies may also be provided so as to allow cloud computing system providers to define their own level of controls/policies to be applied to various BOM components, where these cloud computing system provider specified controls may, in some cases, override the default controls/policies.

Example 6: The limitations of any of Examples 1-5 and 7-10, where the BOM controls mapping data structure further comprises prioritized controls or policies corresponding to dynamically identified vulnerabilities of the cloud computing system, and wherein the prioritized controls or policies are applied by the BOM enabled agent prior to other controls or policies identified from the BOM controls mapping data structure, and if any of the prioritized controls or policies are violated by the edge capacity, the other controls or policies are skipped. These limitations advantageously expedite application of certain controls/policies that are determined to be of higher priority so as to more quickly identify edge capacities that should not be permitted to dock with the cloud computing system. That is, the prioritized controls/policies, if violated, cause the edge capacity to not be able to dock and further checking of all the controls/policies is not required and can be bypassed, resulting in a quicker determination as to whether an edge capacity should be denied permission to dock with the cloud computing system.

Example 7: The limitations of any of Examples 1-6 and 8-10, where the edge capacity comprises one or more computing devices or systems that provide at least one software, hardware, or computer functionality capacity to the cloud computing system. Thus, the illustrative embodiments facilitate the expansion of cloud computing system resources by the docking of additional software, hardware, and/or computer functionality resources when the computing devices/systems providing these resources comply with the automatically determined controls/policies for components specified in the automatically identified BOM for the computing devices/systems.

Example 8: The limitations of any of Examples 1-7 and 9-10, where the BOM data structure received from the BOM enabled agent is a BOM differences data structure specifying differences in configuration of the edge capacity from a previous generation of a BOM data structure by the BOM enabled agent, and wherein performing the lookup operation of components comprises performing the lookup operation only with regard to the differences specified in the BOM differences data structure. These limitations advantageously enabled a quicker identification of applicable controls/policies for changes to BOMs of edge capacities by focusing only on the differences in the BOM data structure from a previous BOM data structure. Assuming that the edge capacity is still in compliance with applicable controls/policies for components which have not changed, allows evaluation of compliance to be performed more quickly with regard to only the changes in the BOM data structure.

Example 9: The limitations of any of Examples 1-8 and 10, where performing the lookup operation of components of the BOM data structure in the BOM controls mapping data structure comprises: performing a similarity analysis of the BOM data structure with one or more second BOM data structures of one or more second edge capacities previously docked with the cloud computing system; and in response to the similarity analysis indicating that a measure of similarity of the BOM data structure meets or exceeds a threshold amount of similarity with at least one second BOM data structure, permitting the edge capacity to dock with the cloud computing system without executing the controls or policies identified in the BOM controls mapping data structure as corresponding to the components of the BOM data structure. The above limitations advantageously allow leveraging of the compliance determinations with regard to similar edge capacities to be used to perform the compliance determinations with regard to other edge capacities so as to more quickly make determinations as to whether an edge capacity should be permitted to dock with the cloud computing system.

Example 10: The limitations of any of Examples 1-9, where the BOM enabled agent is a software bill of materials (SBOM) enabled agent and the BOM data structure is a software bill of materials (SBOM) data structure specifying software components of a software configuration of the edge capacity. These limitations advantageously allow the compliance determinations to be automatically performed with regard to specifically the software configuration of the edge capacities.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 13: A computer-implemented method, system, or computer program product for controlling docking an edge capacity with a cloud computing system. The computer-implemented method, system, or computer program product comprises receiving, from a bill of materials (BOM) enabled agent executing on the edge capacity, a BOM data structure specifying components of a configuration of the edge capacity. The computer-implemented method, system, or computer program product also comprises performing a lookup operation of components of the BOM data structure in a BOM controls mapping data structure, to identify controls or policies applicable to the components of the BOM data structure. In addition, the computer-implemented method, system, or computer program product comprises sending/transmitting the identified controls or policies to the BOM enabled agent for execution on the edge capacity to determine if there are any violations of the controls or policies. Moreover, the computer-implemented method, system, or computer program product comprises receiving results of execution of the identified controls or policies by the BOM enabled agent, where the results specify whether there are any violations of the controls or policies. Furthermore, the computer-implemented method, system, or computer program product comprises denying docking of the edge capacity with the cloud computing system in response to the results specifying that there was at least one violation of the controls or policies.

The computer-implemented method, system or computer program product performs the lookup operation at least by performing a search of components specified in the BOM data structure in the BOM controls mapping data structure that maps components to controls or policies with which the components are to be in compliance, wherein the controls or policies comprise default controls or policies, and one or more cloud computing system provider specified controls or policies. The BOM controls mapping data structure, of the computer-implemented method, system or computer program product, further comprises prioritized controls or policies corresponding to dynamically identified vulnerabilities of the cloud computing system, where the prioritized controls or policies are applied by the BOM enabled agent prior to other controls or policies identified from the BOM controls mapping data structure, and if any of the prioritized controls or policies are violated by the edge capacity, the other controls or policies are skipped. The above example advantageously realizes the benefits described with respect to Examples 1, 5, and 6.

The illustrative embodiments make reference to the concept of "edge capacities." It should be appreciated that the term "edge capacities" is used herein to reference the devices and/or systems that provide processing capabilities, storage capabilities, particular functionalities and services to the cloud computing network. As these devices and systems may have many different configurations both with regard to hardware and software, and provide many different types of processing, storage, and functionalities, they are referred to collectively herein as "edge capacities".

The illustrative embodiments further make reference to the concept of a SBOM and SBOM data structures. The SBOM is a data structure listing the entities, components, libraries of software of a target, and the like, indicating the components of the software of an edge capacity. According to the National Telecommunications and Information Administration (NTIA), the SBOM is a formal record of the components used to develop software and its software supply chain relationships. With the illustrative embodiments, an agent is augmented to include capabilities to compile the SBOM and identify changes in SBOMs for edge capacities. In addition, the SBOM is used by a security and compliance center (SCC) to identify the controls required for a target edge capacity. It should be appreciated that while the illustrative embodiments will focus on SBOMs, the illustrative embodiments are not limited to such and may in fact operate with regard to any bill of materials (BOM) data structure, including hardware bill of materials (HBOM), Software-as-a-Service (SaaS) BOM (SaaSBOM), machine learning bill of materials (ML-BOM), and the like. Thus, while the description of the illustrative embodiments herein will make reference to SBOM enabled agents and SBOMs, the illustrative embodiments are not limited to such, and the agents may in fact be referred to more generally as BOM enabled agents with the data structures being BOM data structures or BOM difference data structures, as will be apparent to those of ordinary skill in the art in view of the present description.

With the mechanisms of the illustrative embodiments, when an edge capacity is trying to dock to a cloud computing system, the edge capacity will initiate a handshake operation with a SCC of the cloud computing system. The SCC will determine if the docking is of a new edge capacity or a previously docked edge capacity. Assuming that this is a new edge capacity docking, the SCC will install an enhanced SCC edge collector with SBOM identification capability, which is referred to herein as a SBOM enabled agent. Once the SCC installs the SBOM enabled agent on the edge capacity, the SBOM enabled agent scans the software configuration of the edge capacity and generates an SBOM of the software configuration. Any currently known, or later developed mechanism for detecting and generating an SBOM may be utilized, such as CycloneDX, Software Package Data Exchange® (SPDX®) available from the Linux Foundation Projects, or the like. The SBOM enabled agent generates the SBOM and reports the SBOM to the SCC.

In the case where the edge capacity that is docking is not a new edge capacity, the SBOM enabled agent implements logic for determining a difference in the SBOM from a previous generation of the SBOM. In such a case, the differences will be used as a basis for lookup of any new or modified controls that should be applied to the edge capacity. The new or modified controls will then be sent from the SCC to the SBOM enabled agent to enforce the controls on the edge capacity.

Thus, based on the SBOM, or differences in SBOM, reported by the SBOM enabled agent, the SCC performs a lookup of the components of the SBOM in an SBOM to security and compliance controls mapping data structure. That is, the SCC is equipped with an additional layer of capability to get the details of the SBOM is able to detect the controls required for the target edge capacity. For example, the security and compliance controls may specify what requirements are needed for an edge capacity to be able to dock with the cloud computing system and be in compliance with the security and compliance policies of the cloud computing system. These controls are mapped to specific components of the software configuration, and thus, the SBOM to security and compliance controls mapping data structure identifies, for the components of the reported SBOM, what security and compliance controls apply to those components. For example, the controls may specify that the software must be compliant with particular government regulations, e.g., the Health Insurance Portability and Accountability Act (HIPPA), which sets forth specific requirements for software with regard to the exchange and accessibility of personally identifiable information and medical information. These controls may specify particular requirements for software to filter data being exchanged, anonymize or otherwise obfuscated personally identifiable information, or the like.

The controls, or policies, may take many different forms depending on the desired implementation. In some cases, the controls/policies may be data structures specifying configuration parameters or the like, which are used to configure software logic executing in the SBOM enabled agents, or other security/compliance software executing at the edge capacity, to ensure compliance with security and compliance regulations. The SBOM enabled agents, security/compliance software, or the like are configured based on the controls/policies which then execute on the particular software configuration of the edge capacity to ensure that all of the components of the software configuration are in compliance with the controls/policies or if they are not, violations are detected and reported back to the SCC and/or authorized persons for mitigation of the potential threat or non-compliance.

In some illustrative embodiments, the controls/policies may be specified as executable rules that are provided to the SBOM enabled agent and/or other security/compliance software of the edge capacity for implementation at the edge capacity. For example, if the SBOM includes libraries such as Log4J and PCI components, a control may specify that "if Log4J 2.16.0 or later, then the components can be considered as PCI compliant" or "PCI compliance requires Log4j 2.16.0 or later". Thus, if the Log4j component in an SBOM data structure is lesser than version 2.16.0, the edge capacity will be considered as non-PCI compliant. If the administrator of the cloud computing system as specified that edge capacities must be PCI compliant in order to dock, or remain docked, with the cloud computing system, then enforcing this control will result in the SBOM enabled agent identifying a violation for the edge capacity having a Log4j version less than 2.16.0, as it will be considered non-PCI compliant. The identified violation may be identified, and appropriate authorized personnel notified.

The authorized personnel may, in response to the notification, try to mitigate the violation. In some cases, the SBOM enabled agent may be automatically requested to mitigate the violation if possible, such as by upgrading the version of the library, software, or the like. This mitigation may or may not be successful in overcoming the violation. If the violation is not mitigated, the SCC may block the docking of the edge capacity or may undock the edge capacity, thereby blocking communications between the edge capacity and the cloud computing system. These are just some examples of how to implement controls/policies, however it should be appreciated that any suitable manner of implementing controls/policies are intended to be within the spirit and scope of the present invention.

The controls may be specified by providers of the cloud computing system as to the security and compliance controls, policies, and the like, which are to be applied to edge capacities attempting to dock with the cloud computing system. The controls and mapping of SBOM components to controls are administrator configurable. The SCC may be provided with a default cloud computing system provider controls listing that may then be mapped to SBOM components. The listings may include a master, or default, list of SBOM entries expected and the required controls for those SBOM entries. The master list may be updated by the cloud computing system provider based on ongoing security issues as well as capabilities. Customers can also provide their own list which may override cloud computing system provider provided lists in some cases.

Based on the results of the lookup of SBOM components in the SBOM to security and compliance controls mapping data structure, the SCC sends control messages to the SBOM enabled agent to have the SBOM enabled agent execute the controls to meet the requirements of the SCC. If the SBOM enabled agent is able to execute these controls successfully, and thus the software configuration of the edge capacity is in compliance with the required security and compliance controls, the successfully completion may be reported to the SCC which then sends permission for the edge capacity to dock to the cloud computing system control plane.

Thus, the SCC gives the "green signal" for docking of an edge capacity based on the dynamic controls selected based on the SBOM of edge capacity as automatically determined by the SBOM enabled agent. This "green signal" is a point in time statement such that if there is a change at a later time in the edge capacity, the evaluation of the compliance and security of the changed edge capacity may be performed again. That is, the SCC can remove edge capacities automatically at later times if it is determined that the differences in the SBOM, and the application of the updated controls, results in a determination that the edge capacity is violating any compliance or security controls/policies.

It should be appreciated that once the SCC installs the SBOM enabled agent on the edge capacity, and the edge capacity has successfully docked with the cloud computing system, the SBOM enabled agent may continue to execute either periodically or continuously. For example, if a change in software configuration is performed, e.g., software is updated, new software installed, or the like, then this may initiate a re-scan by the SBOM enabled agent to collect differences in the SBOM of the current software configuration and the previous SBOM that was generated. In other cases, this monitoring for changes in SBOM may be performed continuously. In either case, the SBOM enabled agent may maintain a history of the differences in SBOMs and provide those differences to the SCC for evaluation and mapping to new or modified controls to be applied to the edge capacity.

If the SBOM enabled agent, in attempting to successfully execute the controls on its edge capacity, determines that the edge capacity violates one or more of the controls, the SBOM enabled agent sends an appropriate notification to authorized personnel, such as an administrator, to inform them of the edge capacity's violation. The administrator may work with the edge capacity provider to attempt to mitigate the violation. In some cases, the SBOM enabled agent may execute logic to attempt to automatically mitigate violations that are detected, such as by upgrading software, libraries, and the like, to compliant versions, changing parameters to be in compliance, or the like. However, if the violation is not mitigated, the edge capacity may be undocked if the edge capacity is already docked with the cloud computing system, or the docking of the edge capacity with the cloud computing system may be denied.

It should be appreciated that in some illustrative embodiments, a fast-forward determination of controls for an edge capacity may be performed based on similarities of SBOMs of the edge capacities. That is, when the SBOM enabled agent generates the SBOM for the edge capacity, the SBOM may be compared to other existing SBOMs for other edge capacities and their corresponding sets of controls. For example, the SCC may be provided with logic to perform a similarity search between SBOMs in a first edge capacity (edge1) and a second edge capacity (edge2), and if edge2 has already docked to the cloud computing system and the measure of similarity is high, i.e., equal to or above a given threshold measure of similarity, with edge1 in terms of the components of the SBOM, then without performing an entire cycle of operation, the SCC may allow edge1 to dock with the cloud computing system. That is, since the SBOMs are sufficiently similar, the SCC determines that there is a high likelihood that the SBOM of edge1 will satisfy the required controls as edge2 already did and thus, a full implementation of the controls by the SBOM enabled agent need not be performed before allowing the edge capacity to dock with the cloud computing system. Of course, the formal execution of controls to confirm compliance may be performed thereafter and if any violation is determined to exist, the edge capacity may be undocked.

In some cases, urgent and priority common vulnerabilities and exposures (CVEs) are identified and thus, controls may be specified in the SBOM to security and compliance controls mapping data structure for these urgent/priority CVEs, e.g., a log 4j issue. These controls may be specified as special or priority controls for all edge capacities in the SBOM to security and compliance controls mapping data structure. Hence, if such urgent/priority controls are specified, these may be executed first by the SBOM enabled agent to determine if there is any violation of these priority/urgent controls. If a violation is found, then the remainder of the SBOM entries may be skipped as the edge capacity is not qualified to dock with the cloud computing system, or must be undocked from the cloud computing system.

Thus, the illustrative embodiments provide an improved computing tool and improved computing tool operations/functionality that enables any heterogenous edge capacity to dock/connect with a cloud computing system in a secure and compliant manner pertaining to overall compliance standards required based on the definitions of controls/policies and mappings with SBOM listed components, as specified in an SCC. The illustrative embodiments operate to automatically perform such compliance based docking/connecting when a new edge capacity attempts to dock/connect with the cloud computing system. Moreover, the illustrative embodiments also continue to operate thereafter to maintain the edge capacity compliance even when there is an indirect change to the configuration of the edge capacity, such as by using SBOM difference detection and reporting to the SCC. Furthermore, in some illustrative embodiments, automatic and quick authorization of new edge capacities is made possible based on SBOM similarity analysis based on previously authorized edge capacities.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a security and compliance center (SCC) having SBOM enabled agents and SBOM to compliance/security controls mapping data structures for automatically applying controls to edge capacities. The improved computing tool implements mechanism and functionality, such as the SCC and SBOM enabled agents, which cannot be practically performed by human beings either outside of, or with the assistance of, a technical environment, such as a mental process or the like. The improved computing tool provides a practical application of the methodology at least in that the improved computing tool is able to automatically and dynamically install SBOM enabled agents on edge capacities and apply compliance and security controls via the SBOM enabled agents for ensuring that edge capacities comply with necessary controls to ensure security and compliance with requirements of a cloud computing system.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as SCC 200, SBOM enabled agent engine 210, SBOM controls engine 240, and SBOM controls mapping data structure 250, as described in further detail hereafter with regard to FIG. 2. In addition to elements 200, 210, 240, and 250, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and elements 200, 210, 240, and 250, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in elements 200, 210, 240, and 250 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in elements 200, 210, 240, and 250 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a SCC 200, SBOM enabled agent engine 210, SBOM controls engine 240, and SBOM controls mapping data structure 250. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatic and dynamic generation of a SBOM from an edge capacity and checking of the edge capacity based on the SBOM to ensure proper compliance with security requirements and regulations of a cloud computing system with which the edge capacity is attempting to dock or has already docked.

Figure 2:
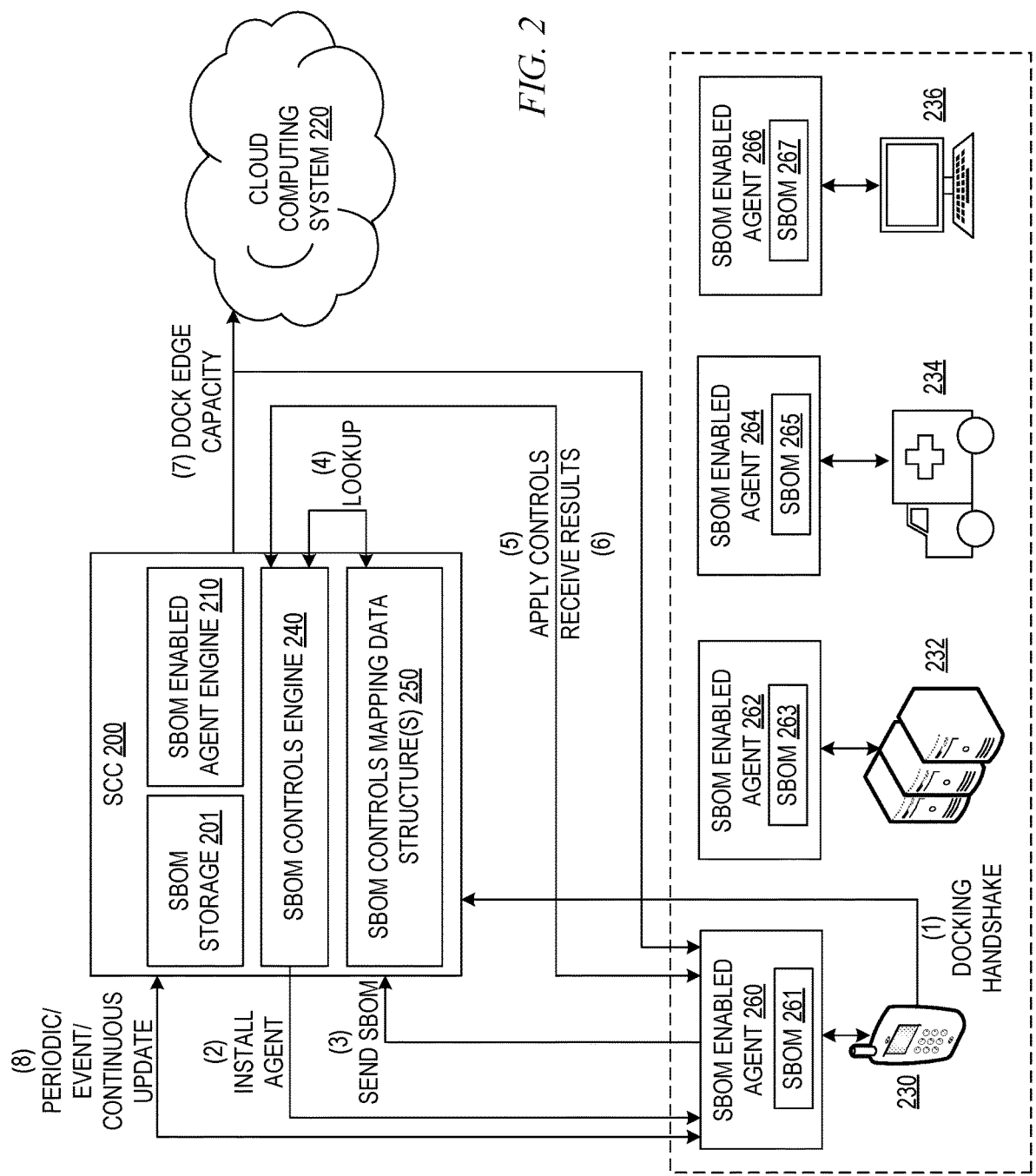
FIG. 2 is an example block diagram illustrating the primary operational components of a SCC with SBOM enabled agents in accordance with one illustrative embodiment.

FIG. 2 is an example block diagram illustrating the primary operational components of a SCC with SBOM enabled agents in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that edge capacities are docked with cloud computing systems while ensuring security and compliance with necessary regulations. These automatically operating computer components and their corresponding computer operations/functionality cannot be practically performed by human beings as a mental process and are not directed to organizing any human activity.

As shown in FIG. 2, the distributed data processing system of FIG. 2 includes a cloud computing system 220 and a plurality of edge capacity computing systems, devices, and the like 230-236. These edge capacities 230-236 may take many different forms including individual devices, e.g., mobile computing devices, vehicle mounted computing devices, client computers, and the like, or more complex systems, such as data centers, server farms, and the like. The edge capacities 230-236 can provide their hardware and/or software capabilities to the cloud computing system 220 to thereby expand the capabilities of the cloud computing system, as well as collaborate the edge capacities 230-236 with other capacities of the cloud computing system and/or other edge capacities connected to the cloud computing system 220. For example, a data center 236 may attempt to dock with the cloud computing system 220 in order to provide functionality of the data center 236 to other computing device/system capabilities of the cloud computing system 220 as well as access capabilities that the data center 236 does not have but may be obtained from the cloud computing system 220 and/or other edge capacities docked with the cloud computing system 220. Essentially, the docking of the edge capacity 230-236 connects the edge capacity with the cloud computing system 220 such that each has access to the resources of the other and can communicate with each other to make use of the services, hardware and/or software, made available from the connection. This is sometimes referred to as bringing the cloud to the edge of the network.

The cloud computing system 220 includes a security and compliance center (SCC) 200 that is augmented to include a software bill of materials (SBOM) enabled agent engine 210, SBOM controls engine 240, and corresponding SBOM to compliance and security controls mapping data structure 250, referred to hereafter as the SBOM mapping data structure 250 for simplicity. The SBOM enabled agent engine 210 provides logic in the SCC 200 to manage the installation and exchange of SBOM data with SBOM enabled agents 260-266 in association with edge capacities 230-236 that are attempting to dock with, or which have already docked with, the cloud computing system 220. The SBOM enabled agents 260-266 comprise logic for generating an SBOM data structure 270 and/or SBOM difference data structure 272 for the software configuration of the edge capacity on which it is installed, as well as logic for applying controls provided by the SCC 200 in response to the SBOM data structure 270 and/or SBOM difference data structure 272. That is, based on the SBOM data structure 270 and/or SBOM different data structure 272 sent by an SBOM enabled agent 260-266 to the SCC 200, the SCC 200 performs a lookup of controls in the SBOM mapping data structure 250 of the components of the SBOM 270, 272 to identify which controls and compliance requirements are to be applied to the components of the edge capacity 230-236 and the SCC 200 then sends these controls to the SBOM enabled agent 260-266 for applying against the software components of the edge capacity 230-236. If no violation of the controls and compliance requirements is found, then the edge capacity 230-236 may be permitted to dock with, or remain docked with, the cloud computing system 220, where docking refers to the registration and integration of the edge capacity 230-236 into the cloud computing system 220.

As shown in FIG. 2, with the mechanisms of the illustrative embodiments, when an edge capacity, e.g., edge capacity 230, such as a data center, mobile computing device, vehicle mounted computing device/system, or the like, is trying to dock to a cloud computing system 220, the edge capacity 230 will initiate a handshake operation (operation 1) with the SCC 200 of the cloud computing system 220. The SCC 200 will determine if the docking is of a new edge capacity 230 or a previously docked edge capacity 230. For example, the SCC 200 may determine whether it has a record of any earlier request from the same edge capacity, which may be determined from maintain a docking request history based on unique edge capacity identifiers, e.g., network and IP addresses. If there is not a previous docking request from this same edge capacity, then this is a new edge capacity. If there is a record of a previous earlier request, the SCC 200 will determine that the edge capacity already has the required SBOM enabled agent installed and will consider this a repeated docking request.

If the edge capacity 230 is determined to be a new edge capacity 230 that has not previously docked with the cloud computing system 220, i.e., the edge capacity 230 does not already have a SBOM enabled agent running on the edge capacity 230, then the SCC 200 will instruct the SBOM enabled agent engine 210 to install an SBOM enabled agent 260, also sometimes referred to herein as an enhanced SCC edge collector with SBOM identification capability, on the edge capacity 230 (operation 2). Once the SCC 200 installs the SBOM enabled agent 260 on the edge capacity 230, the SBOM enabled agent 260 executes and scans the software configuration of the edge capacity 230 and generates an SBOM data structure of the software configuration. For example, the SBOM enabled agent 260 may execute logic similar to CycloneDX, Software Package Data Exchange® (SPDX®) available from the Linux Foundation Projects, or the like, to automatically generate a SBOM data structure for the edge capacity 230 and transmit that SBOM data structure back to the SCC 200 (operation 3).

When the edge capacity 230 is a new edge capacity, this SBOM data structure may be stored in an edge capacity SBOM storage 261 of the SBOM enabled agent 260. In some illustrative embodiments, the SCC 200 may further maintain such SBOM data structures and/or a history of such SBOM data structures or SBOM differences, for each of the SBOM enabled agents 260-266 associated with edge capacities, such as in SBOM storage 201. For example, the SCC 220 may store a mapping of SBOM data structures/SBOM difference histories to edge capacity identifiers such that this mapping in SBOM storage 201 may be used by the other components of the SCC 200, e.g., the SBOM agent engine 210 and/or SBOM controls engine 240, for example, in performing their operations. This original SBOM data structure may serve as a baseline for subsequent generation of SBOM differences data by the SBOM enabled agent 260 and/or SCC 200.

Based on the software components specified in the SBOM data structure sent from the SBOM enabled agent 260, the SBOM controls engine 240 performs a lookup operation in the SBOM mapping data structure 250 for controls, policies, or the like, that are to be applied to the software components specified in the SBOM data structure for the edge capacity 230 (operation 4). As an example, a control may of the type "PCI Compliance: Need>=Log4j 2.16.0" or "Need>=software version X", or "Need>=10 character password" or the like. Many controls/policies may be applied to components in the SBOM data structure in order to detect compliance/violations.

The controls, policies, and the like may be predefined in the SBOM mapping data structure 250 based on a set of default controls, policies, and the like. In addition, the controls, policies, and the like may be customer specified, e.g., a provider of the cloud computing system may specify what controls, policies, and the like are to be applied to any edge capacity 230-236 that wishes to dock with the cloud computing system 220. In addition, the controls, policies, and the like, may include urgent controls/policies that are specified in an ad hoc manner as security and compliance vulnerabilities are determined to be present, such that these controls/policies may be prioritized over other controls/policies when evaluating compliance of an edge capacity 230-236 with requirements of the cloud computing system 220.

The controls, policies, and the like that are identified by the lookup, in the SBOM mapping data structure 250, of the SBOM data structure specified software components, by the SBOM controls engine 240, are transmitted back to the SBOM enabled agent 260 by the SBOM controls engine 240 of the SCC 200 (operation 5). The SBOM enabled agent 260 may store these controls, policies, etc. in association with the SBOM in the SBOM storage 261, and then executes logic to apply the received controls, policies, and the like, to the software components of the edge capacity 230 to ensure compliance of the edge capacity 230 with the security and compliance requirements of the cloud computing system 220. The SBOM enabled agent 260 identifies any violations of these security and compliance requirements, as specified in the controls, policies, and the like, and reports the results of the execution of the controls, policies, etc. to the SCC 200 (operation 6). Assuming that there are no violations, the SCC 200 then allows the edge capacity 230 to dock/connect with the cloud computing system 220 (operation 7).

In the case where the edge capacity 230 that is docking is not a new edge capacity, i.e., the edge capacity 230 has previously docked with the cloud computing system 220, the SBOM enabled agent 260 may implement logic for determining a difference in the SBOM data structure from a previous generation of the SBOM data structure, as noted above. That is, the difference between the SBOM of the current software configuration of the edge capacity 230 and a previous software configuration of the edge capacity 230 may be determined. That is, rather than reporting a full SBOM data structure each time the SBOM enabled agent 260 executes its logic for generating an SBOM based on the software configuration of the edge capacity 230, the SBOM enabled agent 260 may determine differences between the previous SBOM data structure generated (and stored in the storage of the SBOM enabled agent 260), and the currently generated SBOM data structure. The differences may be reported to the SCC 200 rather than the full SBOM data structure (operation 3). In such a case, the SBOM differences are used by the SBOM controls engine 240 as a basis for the lookup of any new or modified controls in the SBOM mapping data structure 250. Thus, rather than having to perform a full lookup again of all the software components of the SBOM, only those that are new or modified are the basis of the lookup operation to identify what other controls, policies, or the like should be applied to the edge capacity 230 due to the change in software configuration of the edge capacity 230. These new or modified controls may be in addition to the previously identified controls based on the previous SBOM data structure. The new or modified controls will then be sent from the SCC 200, e.g., from the SBOM controls engine 240, to the SBOM enabled agent 260 for application to the software components of the edge capacity 230 to enforce the controls on the edge capacity 230 and identify any violations of security and compliance requirements.

Thus, based on the SBOM, or differences in SBOM, reported by the SBOM enabled agent 260, the SCC 200 performs a lookup of the components of the SBOM in an SBOM mapping data structure 250. That is, the SCC 200 is equipped with an additional layer of capability to get the details of the SBOM and detect the controls required for the target edge capacity 230. For example, the security and compliance controls may specify what requirements are needed for an edge capacity 230 to be able to dock with the cloud computing system 220 and be in compliance with the security and compliance policies of the cloud computing system 220. These controls are mapped to specific components of the software configuration, and thus, the SBOM mapping data structure 250 identifies, for the components of the reported SBOM data structure or SBOM differences, what security and compliance controls apply to those components. Using the previously mentioned example of HIPPA compliance, the controls may specify that the software must be compliant with regard to the exchange and accessibility of personally identifiable information and medical information. These controls may specify particular requirements for software to filter data being exchanged, anonymize the data, or otherwise obfuscated personally identifiable information, or the like.

As noted previously, the controls, policies, and the like, that are part of the SBOM mapping data structure 250 may be specified by providers of the cloud computing system 220 as to the security and compliance controls, policies, and the like, that are to be applied to all edge capacities 230-236 attempting to dock with the cloud computing system 220. The controls, and mapping of SBOM components to controls, are administrator configurable. The SCC 200 may be provided with a default cloud computing system provider controls listing that may then be mapped to SBOM components. The listings may include a master, or default, list of SBOM entries expected and the required controls for those SBOM entries. The master list may be updated by the cloud computing system provider based on ongoing security issues as well as capabilities. Customers can also provide their own list which may override cloud computing system provider provided lists in some cases. For example, a default control may be in order for the edge capacity to PCI compliant, it must have Log4j 2.16.0 or later version (Need>=Log4j 2.16.0). However, a customer may override this default rule by specifying that this requirement is not needed, e.g., the system is a test system and does not need to be PCI compliant, thereby removing this control from being enforced by the SCC 200 and SBOM enabled agent 260.

Based on the results of the lookup of SBOM components in the SBOM mapping data structure 250, the SCC 200 sends/transmits control messages to the SBOM enabled agent 260 to have the SBOM enabled agent 260 execute the controls, policies, or the like, to meet the requirements of the SCC 200 and/or identify any violations of the security and compliance requirements specified in the controls, policies, or the like. If the SBOM enabled agent 260 is able to execute these controls successfully, and thus the software configuration of the edge capacity 230 is in compliance with the required security and compliance controls, the successful completion may be reported to the SCC 200 which then sends permission for the edge capacity 230 to dock to the cloud computing system 220 control plane.

Thus, the SCC 200 gives the "green signal" for docking of an edge capacity 230 based on the dynamic controls selected based on the SBOM of edge capacity 230 as automatically determined by the SBOM enabled agent 260. This "green signal" is a point in time statement such that if there is a change at a later time in the edge capacity 230, the evaluation of the compliance and security of the changed edge capacity 230 may be performed again. That is, the SBOM enabled agent 260 may periodically, continuously, or in response to a detected event, re-execute the SBOM generation operations discussed above (operation 8).

For example, if a change in software configuration of the edge capacity is detected, e.g., software components are installed, modified, or removed, the change in software configuration may cause an event that triggers execute of the SBOM enabled agent 260 to perform an update of the SBOM data structure for the edge capacity 230. This may involve the generation of an SBOM difference data structure which is then reported back to the SCC 200 for identifying the controls, policies, and the like, that are applicable to the current configuration of the edge capacity 230, as previously discussed above. In some cases, rather than requiring a specific detection in a change in the software configuration, the SBOM enabled agent 260 may periodically, at a predefined time intervals, execute the SBOM generation logic and if there is no difference from a previous SBOM, go back to sleep. Otherwise, if there is a difference, the SBOM difference data is again sent to the SCC 200 for processing as noted above.

The SCC 200 can automatically remove edge capacities 230 from being able to be docked with the cloud computing system 220 at later times if it is determined that the differences in the SBOM data structures, and the application of the updated controls, results in a determination that the edge capacity 230 is now violating any compliance or security controls/policies. That is, even though an edge capacity 230 may be currently docked with the cloud computing system 220, if it is determined through operation of the SBOM enabled agent 260 and the SCC 200, that the edge capacity 230 is no longer in compliance, or violates security requirements, then the SCC 200 may automatically undock the edge capacity 230 from the cloud computing system 220 until the edge capacity 230 is brought back into compliance or the violations are able to be mitigated.

Thus, if the SBOM enabled agent 260, in attempting to successfully execute the controls on its edge capacity 230, determines that the edge capacity 230 violates one or more of the controls, either during the initial docking of the edge capacity 230 or thereafter at periodic, continuous, or event triggered re-execution of the SBOM enabled agent 260 logic for generating SBOM data structures or SBOM differences, the SBOM enabled agent 260 sends an appropriate notification to authorized personnel, such as an administrator, to inform them of the edge capacity's violation. The administrator may work with the edge capacity 230 provider to attempt to mitigate the violation. In some cases, the SBOM enabled agent 260 may execute logic to attempt to automatically mitigate violations that are detected, such as by upgrading software, libraries, and the like, to compliant versions, changing parameters to be in compliance, or the like. However, if the violation is not mitigated, the edge capacity 230 may be undocked if the edge capacity 230 is already docked with the cloud computing system 220, or the docking of the edge capacity 230 with the cloud computing system 220 may be denied if it is not already docked with the cloud computing system 220.

In identifying the controls, policies, and the like, that apply to an edge capacity 230, the SCC 200 may comprise logic in the SBOM controls engine 240 for implementing a fast-forward determination of controls for an edge capacity 230. That is, the SBOM controls engine 240 may utilize the SBOM to edge capacity identifier mapping data structures in SBOM storage 201, which may store a correspondence between SBOM, edge capacity identifier, and identified controls, policies, and the like identified by the SBOM controls engine 240 through a lookup in the SBOM mapping data structure 250, for each of the edge capacities 230-236 that have docked with the cloud computing system 220. The SBOM controls engine 240, given a SBOM data structure of an edge capacity, may perform a similarity analysis of the SBOM data structure with SBOM data structures of other edge capacities 230-236 as indicated in this SBOM storage 201. Based on a similar edge capacity being identified, the controls, policies, and the like, that have been applied to the similar edge capacity may be applied to the current edge capacity. In some cases, if the similarity is sufficiently high, then it may be automatically determined that the new edge capacity is sufficiently similar to the previously docked edge capacity that the new edge capacity is similarly in compliance with the corresponding controls, policies, and the like, such that the new edge capacity may be automatically permitted to dock with the cloud computing system 220 without requiring a prior lookup and execution of controls, policies, and the like, by the SBOM enabled agent.

That is, when the SBOM enabled agent 266 installed on edge capacity 236 generates the SBOM data structure 267 for the edge capacity 236, the SBOM 267 may be compared to other existing SBOMs in the SBOM storage 201 for other edge capacities 230-234 and their corresponding sets of controls, policies, and the like. For example, the SBOM controls engine 240 of the SCC 200 may be provided with logic to perform a similarity search between SBOMs in a first edge capacity 236 and a second edge capacity 230, and if the second edge capacity 230 has already docked to the cloud computing system 220 and the measure of similarity is high between the SBOMs of the first and second edge capacities 230 and 236, i.e., equal to or above a given threshold measure of similarity, then without performing an entire cycle of operation, the SCC 200 may allow the first edge capacity 236 to dock with the cloud computing system 220. That is, since the SBOMs 261 and 267 are sufficiently similar, the SBOM controls engine 240 of the SCC 200 determines that there is a high likelihood that the SBOM 266 of the first edge capacity 236 will satisfy the required controls, policies, and the like, just as the second edge capacity 230 already did and thus, a full implementation of the controls, policies, and the like, by the SBOM enabled agent 266 need not be performed before allowing the edge capacity 236 to dock with the cloud computing system 220. Of course, the formal execution of controls, policies, and the like, to confirm compliance may be performed thereafter by the SBOM enabled agent 266, and if any violation is determined to exist, the edge capacity 236 may be undocked.

In some cases, urgent and priority common vulnerabilities and exposures (CVEs) are identified and thus, controls may be specified in the SBOM mapping data structure 250 for these urgent/priority CVEs, e.g., a log 4j issue. These controls may be specified as special or priority controls for all edge capacities 230-236 in the SBOM mapping data structure 250. Hence, if such urgent/priority controls are specified, these may be executed first by the SBOM enabled agents 260-266 to determine if there is any violation of these priority/urgent controls. If a violation is found, then the remainder of the controls, policies, etc., for the other SBOM entries may be skipped as the edge capacity 230-236 is not qualified to dock with the cloud computing system 220 due to the violation of the urgent/priority controls, or must be undocked from the cloud computing system 220.

Thus, the illustrative embodiments provide an improved computing tool and improved computing tool operations/functionality for automatically determining what controls, policies, and the like, are to be enforced on edge capacities attempting to dock with, or which are already docked with, a cloud computing system. This determination may be performed automatically and dynamically without human intervention. Specialized SBOM enabled agents are utilized to automatically and dynamically generate SBOM data structures for edge capacities, and/or SBOM differences as changes to software configurations of edge capacities are detected. The illustrative embodiments enabled improved security and compliance with regulations by edge capacities by automatically applying controls, policies, and the like, which automatically determine violations and prevent docking or undock edge capacities that are not in compliance. Moreover, notifications may be sent to administrators or other authorized personnel in response to violations being detected so that such violations may be mitigated and the edge capacities brought into compliance in order to dock with the cloud computing system.

Figure 3:
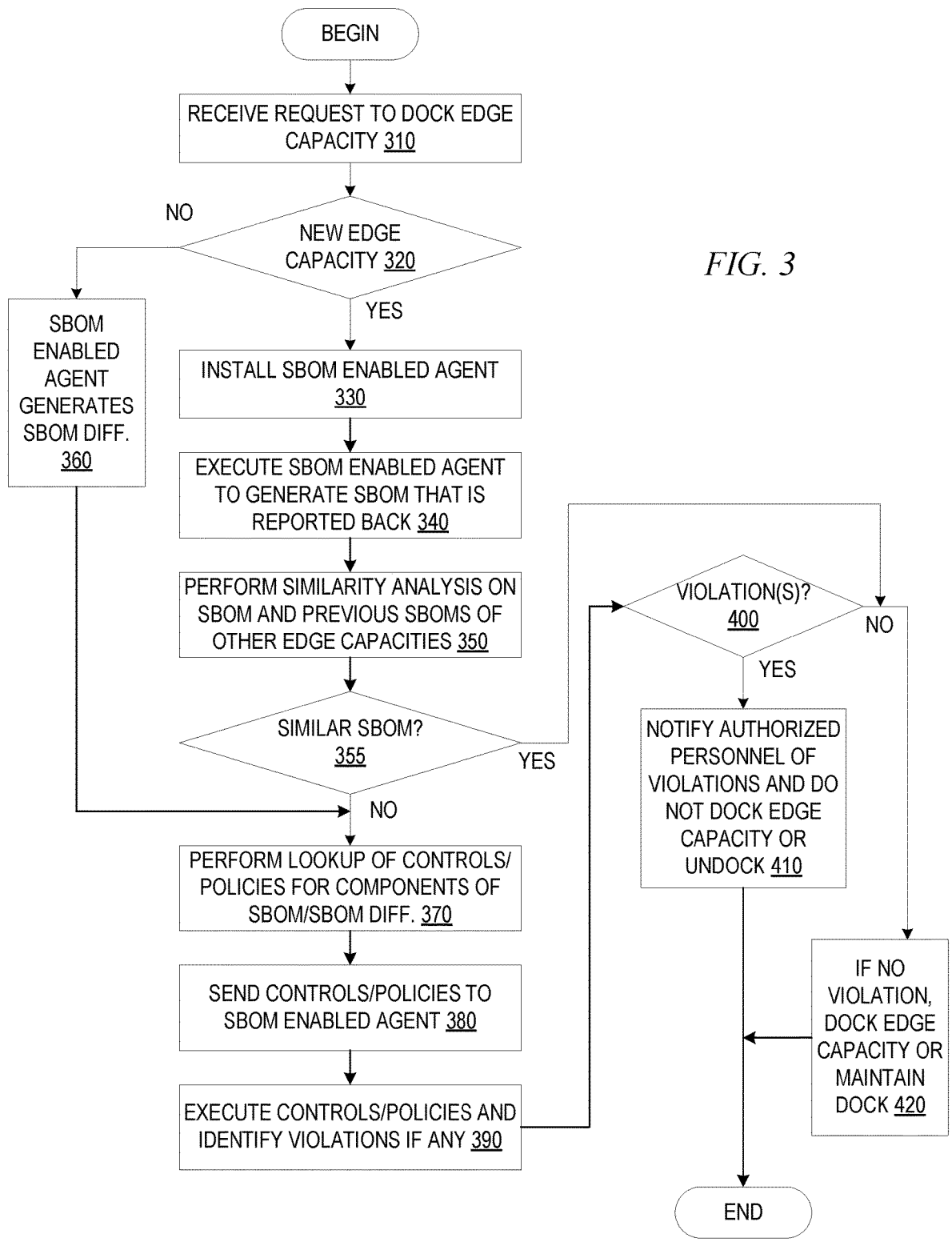
FIG. 3 is a flowchart outlining an example operation for docking an edge capacity with a cloud computing system in accordance with one illustrative embodiment.

FIG. 3 presents a flowchart outlining example operations of elements of the present invention with regard to one or more illustrative embodiments. It should be appreciated that the operations outlined in FIG. 3 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 3, and may, in some cases, make use of the results generated as a consequence of the operations set forth in FIG. 3, the operations in FIG. 3 themselves are specifically performed by the improved computing tool in an automated manner.

FIG. 3 is a flowchart outlining an example operation for docking an edge capacity with a cloud computing system in accordance with one illustrative embodiment. As shown in FIG. 3, the operation starts by receiving a request to dock an edge capacity with a cloud computing system (step 310). A determination is made as to whether the edge capacity is a new edge capacity or not (step 320). If the edge capacity is a new edge capacity, then an SBOM enabled agent is installed on the new edge capacity (step 330). Thereafter, the SBOM enabled agent is executed on the edge capacity to generate a SBOM that is reported back (step 340). A similarity analysis is performed on the SBOM with other SBOMs of previously docked edge capacities to determine if there is a sufficiently similar previously docked edge capacity (step 350). If there is a sufficiently similar previously docked edge capacity (step 355), then the current edge capacity is permitted to dock with the cloud computing system (step 420).

If the edge capacity is not a new edge capacity, then the SBOM enabled agent generates an SBOM differences data structure that is reported back (step 360). Assuming that there is no sufficiently similar previously docked edge capacity, or that the edge capacity is not a new edge capacity, based on the SBOM or SBOM differences, a lookup of controls, policies, and the like, for the components of the SBOM/SBOM differences is performed (step 370). The controls, policies, etc. are sent to the SBOM enabled agent installed on the edge capacity (step 380). The SBOM enabled agent executes the controls, policies, etc., and determines if there are any violations and returns a report of the results (step 390). A determination is made as to whether the edge capacity violates any controls, policies, or the like (step 400). If so, the violations are notified to appropriate personnel and the edge capacity is not permitted to dock or is undocked from the cloud computing system (step 410). If there are no violations, then the edge capacity is permitted to dock or remain docked with the cloud computing system (step 420). The operation then terminates. It should be appreciated that while FIG. 3 shows the operation terminating, this process, or portions of this process, may be repeated for subsequent iterations of the SBOM enabled agent in response to periodic, continuous, or event triggered executions to ensure continued compliance of the edge capacity with security and compliance requirements.

Again, it should be appreciated that while the primary illustrative embodiments are described herein with regard to specifically software bill of materials (SBOMs), the illustrative embodiments are not limited to such. Rather, the illustrative embodiments are also able to perform their operations and functionality with any suitable bill of materials (BOM) data structures that may be automatically and dynamically generated by an enabled agent executing on an edge capacity. For example, the BOM may instead be a hardware bill of materials (HBOM), a machine learning bill of materials (ML-BOM), Software-as-a-Service (SaaS) BOM (SaaSBOM), or the like. Thus, the agents may also be referred to as BOM enabled agents, as they have applicability to a variety of different BOM data structures and corresponding enforcement of controls, policies, and the like.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for controlling docking of an edge capacity with a cloud computing system, the method comprising:
   receiving, from a bill of materials (BOM) enabled agent executing on the edge capacity, a BOM data structure specifying components of a configuration of the edge capacity;
   performing a lookup operation of components of the BOM data structure in a BOM controls mapping data structure, to identify controls or policies applicable to the components of the BOM data structure;
   transmitting the identified controls or policies to the BOM enabled agent for execution on the edge capacity to determine if there are any violations of the controls or policies;
   receiving results of execution of the identified controls or policies by the BOM enabled agent, wherein the results specify whether there are any violations of the controls or policies; and
   denying docking of the edge capacity with the cloud computing system in response to the results specifying that there was at least one violation of the controls or policies.

2. The method of claim 1, wherein the BOM enabled agent automatically scans the configuration of the edge capacity to generate the BOM data structure in response to a request from the edge capacity to dock with the cloud computing system.

3. The method of claim 1, wherein the BOM enabled agent automatically scans the configuration of the edge capacity to generate the BOM data structure periodically while the BOM enabled agent is executing on the edge capacity.

4. The method of claim 1, wherein the BOM enabled agent automatically scans the configuration of the edge capacity to generate the BOM data structure in response to a detected event, wherein the detected event is a change in configuration of the edge capacity.

5. The method of claim 1, wherein performing the lookup operation comprises performing a search of components specified in the BOM data structure in the BOM controls mapping data structure that maps components to controls or policies with which the components are to be in compliance, wherein the controls or policies comprise default controls or policies, and one or more cloud computing system provider specified controls or policies.

6. The method of claim 5, wherein the BOM controls mapping data structure further comprises prioritized controls or policies corresponding to dynamically identified vulnerabilities of the cloud computing system, and wherein the prioritized controls or policies are applied by the BOM enabled agent prior to other controls or policies identified from the BOM controls mapping data structure, and if any of the prioritized controls or policies are violated by the edge capacity, the other controls or policies are skipped.

7. The method of claim 1, wherein the edge capacity comprises one or more computing devices or systems that provide at least one software, hardware, or computer functionality capacity to the cloud computing system.

8. The method of claim 1, wherein the BOM data structure received from the BOM enabled agent is a BOM differences data structure specifying differences in configuration of the edge capacity from a previous generation of a BOM data structure by the BOM enabled agent, and wherein performing the lookup operation of components comprises performing the lookup operation only with regard to the differences specified in the BOM differences data structure.

9. The method of claim 1, wherein performing the lookup operation of components of the BOM data structure in the BOM controls mapping data structure comprises:
   performing a similarity analysis of the BOM data structure with one or more second BOM data structures of one or more second edge capacities previously docked with the cloud computing system; and
   in response to the similarity analysis indicating that a measure of similarity of the BOM data structure meets or exceeds a threshold amount of similarity with at least one second BOM data structure, permitting the edge capacity to dock with the cloud computing system without executing the controls or policies identified in the BOM controls mapping data structure as corresponding to the components of the BOM data structure.

10. The method of claim 1, wherein the BOM enabled agent is a software bill of materials (SBOM) enabled agent and the BOM data structure is a software bill of materials (SBOM) data structure specifying software components of a software configuration of the edge capacity.

11. A computer program product comprising a computer readable storage medium having a computer readable program stored therein, wherein the computer readable program, when executed on a computing device, causes the computing device to:
   receive, from a bill of materials (BOM) enabled agent executing on an edge capacity, a BOM data structure specifying components of a configuration of the edge capacity;
   perform a lookup operation of components of the BOM data structure in a BOM controls mapping data structure, to identify controls or policies applicable to the components of the BOM data structure;
   transmit the identified controls or policies to the BOM enabled agent for execution on the edge capacity to determine if there are any violations of the controls or policies;
   receive results of execution of the identified controls or policies by the BOM enabled agent, wherein the results specify whether there are any violations of the controls or policies; and
   deny docking of the edge capacity with the cloud computing system in response to the results specifying that there was at least one violation of the controls or policies.

12. The computer program product of claim 11, wherein the BOM enabled agent automatically scans the configuration of the edge capacity to generate the BOM data structure in response to a request from the edge capacity to dock with the cloud computing system.

13. The computer program product of claim 11, wherein the BOM enabled agent automatically scans the configuration of the edge capacity to generate the BOM data structure periodically while the BOM enabled agent is executing on the edge capacity.

14. The computer program product of claim 11, wherein the BOM enabled agent automatically scans the configuration of the edge capacity to generate the BOM data structure in response to a detected event, wherein the detected event is a change in configuration of the edge capacity.

15. The computer program product of claim 11, wherein performing the lookup operation comprises performing a search of components specified in the BOM data structure in the BOM controls mapping data structure that maps components to controls or policies with which the components are to be in compliance, wherein the controls or policies comprise default controls or policies, and one or more cloud computing system provider specified controls or policies.

16. The computer program product of claim 15, wherein the BOM controls mapping data structure further comprises prioritized controls or policies corresponding to dynamically identified vulnerabilities of the cloud computing system, and wherein the prioritized controls or policies are applied by the BOM enabled agent prior to other controls or policies identified from the BOM controls mapping data structure, and if any of the prioritized controls or policies are violated by the edge capacity, the other controls or policies are skipped.

17. The computer program product of claim 11, wherein the edge capacity comprises one or more computing devices or systems that provide at least one software, hardware, or computer functionality capacity to the cloud computing system.

18. The computer program product of claim 11, wherein the BOM data structure received from the BOM enabled agent is a BOM differences data structure specifying differences in configuration of the edge capacity from a previous generation of a BOM data structure by the BOM enabled agent, and wherein performing the lookup operation of components comprises performing the lookup operation only with regard to the differences specified in the BOM differences data structure.

19. The computer program product of claim 11, wherein performing the lookup operation of components of the BOM data structure in the BOM controls mapping data structure comprises:
   performing a similarity analysis of the BOM data structure with one or more second BOM data structures of one or more second edge capacities previously docked with the cloud computing system; and
   in response to the similarity analysis indicating that a measure of similarity of the BOM data structure meets or exceeds a threshold amount of similarity with at least one second BOM data structure, permitting the edge capacity to dock with the cloud computing system without executing the controls or policies identified in the BOM controls mapping data structure as corresponding to the components of the BOM data structure.

20. An apparatus comprising:
   at least one processor; and
   at least one memory coupled to the at least one processor, wherein the at least one memory comprises instructions which, when executed by the at least one processor, cause the at least one processor to:
   receive, from a bill of materials (BOM) enabled agent executing on an edge capacity, a BOM data structure specifying components of a configuration of the edge capacity;
   perform a lookup operation of components of the BOM data structure in a BOM controls mapping data structure, to identify controls or policies applicable to the components of the BOM data structure;
   transmit the identified controls or policies to the BOM enabled agent for execution on the edge capacity to determine if there are any violations of the controls or policies;
   receive results of execution of the identified controls or policies by the BOM enabled agent, wherein the results specify whether there are any violations of the controls or policies; and
   deny docking of the edge capacity with the cloud computing system in response to the results specifying that there was at least one violation of the controls or policies.

\* \* \* \* \*